United States Patent [19]
Casper et al.

[11] Patent Number: 6,068,313
[45] Date of Patent: May 30, 2000

[54] PIZZA PADDLE DEVICE

[76] Inventors: Gary D. Casper; Jennifer P. Casper, both of 9 Reed La., Clifton Park, N.Y. 12065

[21] Appl. No.: 09/351,012

[22] Filed: Jul. 12, 1999

[51] Int. Cl.$^7$ .................................................. A47J 43/28
[52] U.S. Cl. .............................. 294/7; 294/49; 294/26.5
[58] Field of Search ............................ 294/1.1, 1.3, 1.4, 294/7, 8, 26.5, 32, 34, 49, 54.5; 15/104.002; 37/237

[56] References Cited

U.S. PATENT DOCUMENTS

| | | | |
|---|---|---|---|
| D. 337,032 | 7/1993 | Galati | D7/688 |
| 1,135,906 | 4/1915 | Ludwig | 294/26.5 |
| 2,006,579 | 7/1935 | Anello et al. | 294/26.5 |
| 2,950,547 | 8/1960 | Murphy | 37/237 |
| 3,002,298 | 10/1961 | Baldwin | 37/237 |
| 4,753,472 | 6/1988 | Fout | 294/32 |
| 5,213,384 | 5/1993 | Baker | 294/7 |
| 5,417,463 | 5/1995 | DiPaola | 294/7 |
| 5,716,086 | 2/1998 | Bifulco | 294/7 |

Primary Examiner—Dean J. Kramer
Attorney, Agent, or Firm—Charles A. Taylor

[57] ABSTRACT

A pizza paddle device is disclosed which can be used to transfer pizza or other food items between preparation surfaces and a pizza stone or other heating surface. The device comprises a support handle portion, a spatula portion for supporting the pizza or other food item having a support surface, an endless belt and an endless belt handle. When used for pizza, the pizza may be prepared on a preparation surface. When ready for cooking the pizza is moved onto the belt and transported to the preheated pizza stone. The device is used to transfer the pizza from the preparation surface by moving the device in a forward motion underneath the pizza. By holding the endless belt handle stationary, the endless belt is caused to rotate about the spatula portion. The forward motion coupled with the endless belt rotation results in the pizza being transferred to the pizza paddle device without disturbance. Pulling the device rearward, while holding the endless belt handle stationary, causes the pizza to be similarly transferred from the endless belt onto the pizza stone or other desired surface.

6 Claims, 2 Drawing Sheets

PIZZA PADDLE DEVICE

FIELD OF THE INVENTION

The present invention relates generally to the field of food item supporting and serving devices. More specifically, a pizza paddle device is disclosed which can be used to transfer pizza or other food items from a preparation area onto a pizza stone or other heating surface.

The pizza paddle device includes an endless belt, the endless belt further having an upper and a lower run covering the top and bottom surfaces of the spatula support portion of the device. Pulling or pushing the support handle portion while holding the endless belt handle means stationary causes the endless belt to rotate about the spatula portion in an auto-synchronous manner to move a pizza or other food items onto or off the endless belt without disturbance of the pizza or other food items.

DESCRIPTION OF THE RELATED ART

In prior art, there have been various kitchen paddles for supporting and carrying pizzas and other food items. Conventional baker's peels or pizza paddles are basically large wooden or metal spatulas with a flat plate. The food item is placed on the plate and then pushed or slid onto the cooking or heating surface. A problem with these paddles has been that the food item often sticks to the paddle support surface so that removal of the food item from the paddle is awkward and potentially damaging to the food item. Several inventions have incorporated holes in the flat plate section and an air source to blow air under the food item to lift it from the surface of the flat plate so that it might be moved to the cooking surface.

It is an object of the present invention, to provide a pizza paddle device for supporting a food item such as pizza which includes a mechanism for gently lifting from a preparation surface and discharging the pizza from the pizza paddle device by moving an endless belt for easy removal.

It is a further object of the present invention to provide such an apparatus which is simple in design and which can substantially conform to conventional pizza paddle configurations familiar to persons using a pizza paddle in their home or for those working in the industry.

It is still another object of the present invention to provide such an apparatus which is reliable and consistent with frequent use.

It is yet another object of the present invention to provide such an apparatus which is relatively inexpensive to manufacture.

SUMMARY OF THE INVENTION

The present invention provides a pizza paddle device which accomplishes the abovestated objectives, as well as others, and which overcomes the disadvantages of the prior art. A pizza paddle apparatus for supporting a pizza is provided, wherein the pizza paddle device includes a handle portion, a spatula portion for supporting the pizza or other food item having a support surface, an endless belt and an endless belt handle. When used for pizza, the pizza is prepared in a preparation area. When ready for cooking the pizza is moved onto the belt and transported to the preheated pizza stone. The device is used to lift the pizza from the preparation surface, transport the pizza to the cooking area and place the pizza onto the heated pizza stone. Transfer of the pizza onto and off of the device is facilitated by rotation of the endless belt about the spatula portion. Pulling or pushing the support handle portion while holding the endless belt handle means stationary causes the endless belt to rotate about the spatula portion in an autosynchronous manner to move a pizza or other food items onto or off the endless belt without disturbance of the pizza or other food items. Utility of the present invention is unaffected by any resident adhesion to the preparation surface. Other features and advantages of the present invention will become apparent from the following detailed description, the appended drawings and the accompanying claims.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENT

Figure 1:
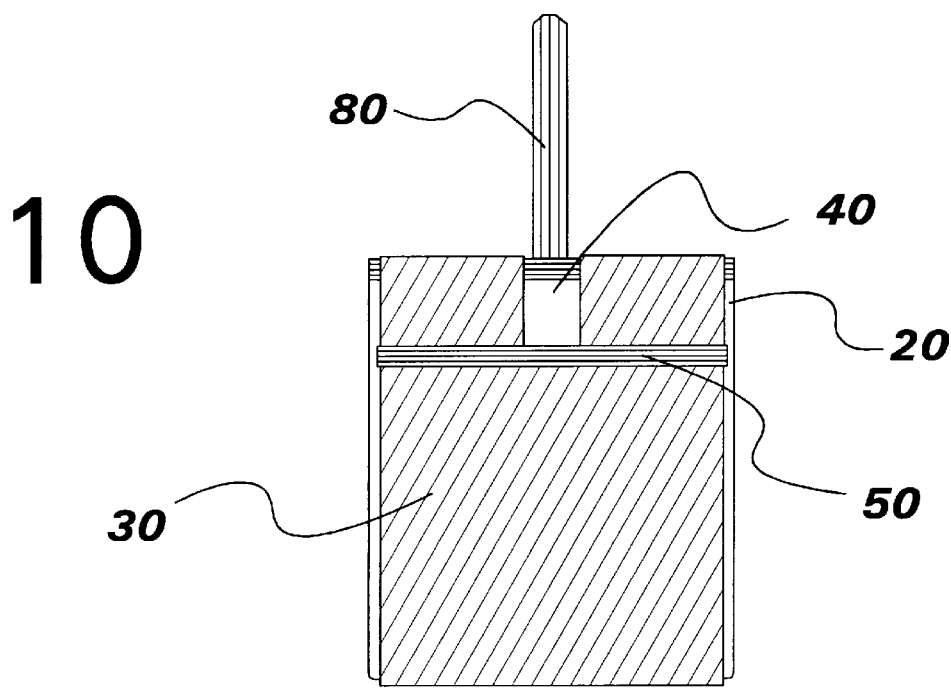
FIG. 1 is a perspective top view of the first preferred embodiment of the present invention, showing the support handle portion, the pizza supporting spatula portion, the endless belt and the endless belt handle.

The invention disclosed herein is, of course, susceptible of embodiment in many different forms. Shown in the drawings and described hereinbelow in detail are preferred embodiments of the invention. It is to be understood, however, that the present disclosure is an exemplification of the principles of the invention and does not limit the invention to the illustrated embodiments.

The present invention is a pizza paddle device which can be used to transfer pizza or other food items from one preparation surface to another or onto a pizza stone or other heating surface. The device includes a support handle portion, a spatula portion for supporting the pizza or other food item having a support surface, an endless belt and an endless belt handle. When used for pizza, the pizza is prepared on a preparation surface. When ready for cooking, the pizza is moved onto the belt and transported to the preheated pizza stone. The device is used to lift the pizza from the preparation surface, transport the pizza to the cooking area and place the pizza onto the heated pizza stone. Transfer of the pizza onto and off of the device is facilitated by rotation of the endless belt about the spatula portion. Pulling or pushing the support handle portion while holding the endless belt handle means stationary causes the endless belt to rotate about the spatula portion in an autosynchronous manner to move a pizza or other food items onto or off the endless belt without disturbance of the pizza or other food items.

Referring now to the detailed drawings there is illustrated device in accordance with the present invention which demonstrates the preferred embodiment of the present invention, wherein like referenced numerals refer to like elements throughout the drawings.

Figure 2:
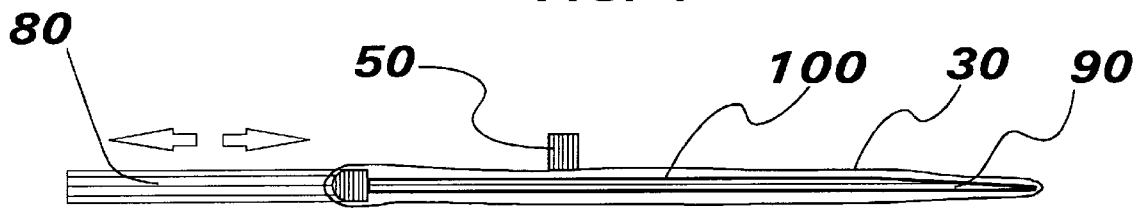
FIG. 2 is perspective side view of the embodiment of FIG. 1 further showing the handle portion, the pizza supporting spatula portion, the endless belt and the endless belt handle.
Figure 3:
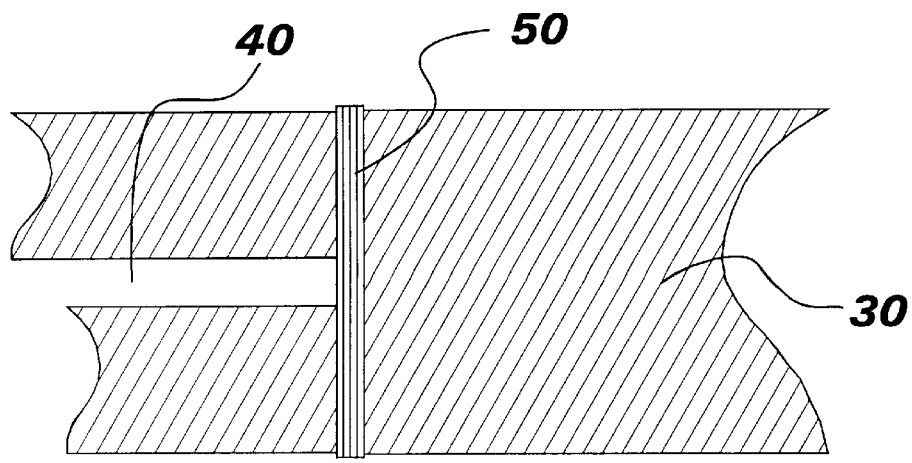
FIG. 3 is a perspective partial top view of the endless belt as shown in FIG. 1.

In the preferred embodiment, as demonstrated in FIGS. 1, 2 and 3, a pizza paddle device 10 for transferring a pizza or other food items from a preparation area onto a pizza stone or other heating surface. As shown in FIG. 1, a pizza paddle device 10 is comprised of a spatula portion 20, wherein said spatula portion 20 further having a support surface 100 wherein pizza or other food item are supported, a support handle portion 80, and a tapered end section 90 (not shown), and an endless belt 30 of circular configuration having an elongated slot 40 therethrough and continuing for not more than half the total length of said endless belt 30 and a belt handle means 50, whereby pulling or pushing the support handle portion 80 while holding the endless belt handle means 50 stationary causes the endless belt 30 to rotate about said spatula portion 20 in an auto-synchronous manner to move a pizza or other food items onto or off the endless belt 30 without disturbance of the pizza or other food items. Utility of the present invention is unaffected by any resident adhesion of the pizza or other food items to the preparation surface. Further said endless belt 30 having an elongated longitudinal slot 40 beginning at said belt handle means 50 and continuing for approximately half the total length of said endless belt 30 in a direction proximal to said support handle portion and further said longitudinal slot 40 configured to allow said support handle portion 80 to pass through said elongated longitudinal slot 40 and thereby said longitudinal slot 40 engaging said support handle portion 80. Said belt handle means 50 comprises a belt handle attached by any appropriate means in a direction horizontal to said endless belt preferably providing easy attachment and detachment of said endless belt 30 to said pizza paddle device.

As further shown in FIG. 2 said spatula portion 20 having a support surface 100 and further having a minimal thickness or a tapered end 90 at the end of said spatula portion distal to said support handle portion 80. Said endless belt 30 is positioned such that pushing or pulling said support handle portion 80 while maintaining said endless belt handle means 50 stationary causes rotation of endless belt 30 whereby said endless belt 30 engages and slides past said support handle portion 80 and continues under said spatula portion 20 and over the tapered end section 90 and continues to said belt handle means 50.

FIG. 3 further demonstrates said endless belt 30 has said elongated longitudinal slot section 40 and said belt handle means 50. Said endless belt 30 is configured such that said elongated longitudinal slot 40 begins at said belt handle means 50 and continues for approximately (not more than) half the total length of said endless belt 30 whereby said elongated longitudinal slot 40 is proximal to the support handle portion 80 as shown in FIG. 2.

Figure 5:
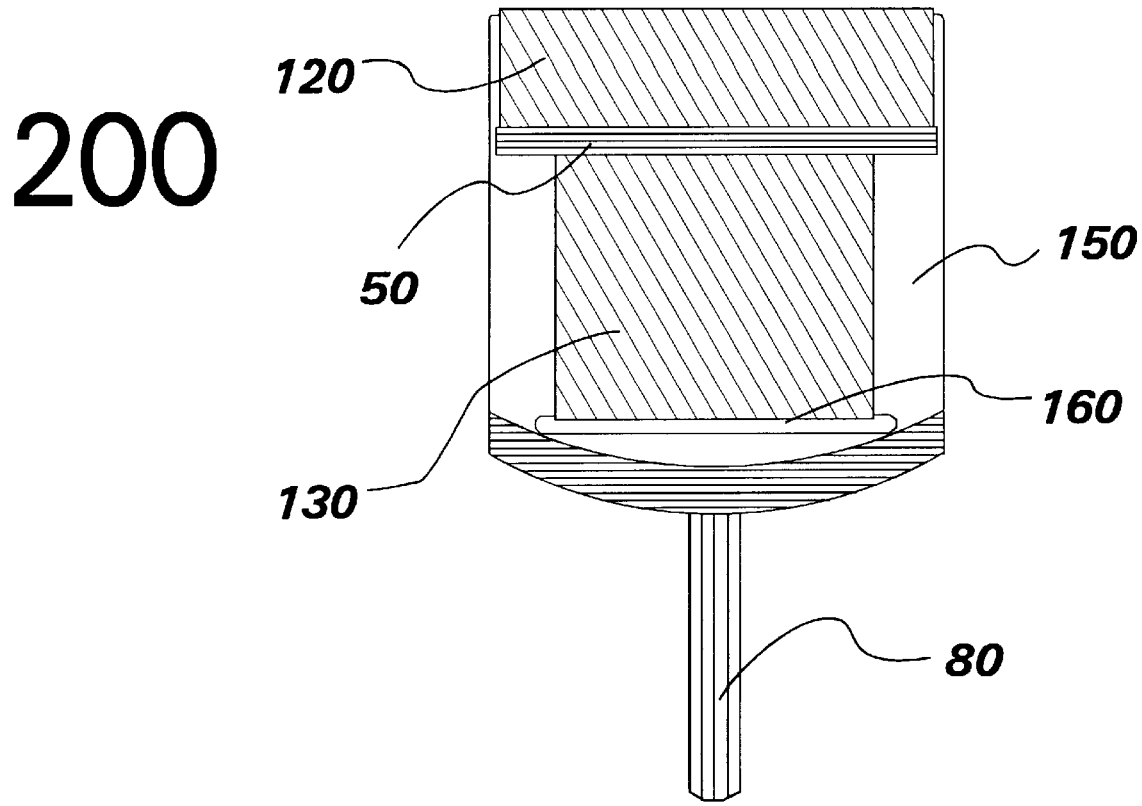
FIG. 5 is a perspective top view of an alternative embodiment of the present invention, showing the support handle portion, the pizza supporting spatula portion, the alternative endless belt and the endless belt handle means.
Figure 4:
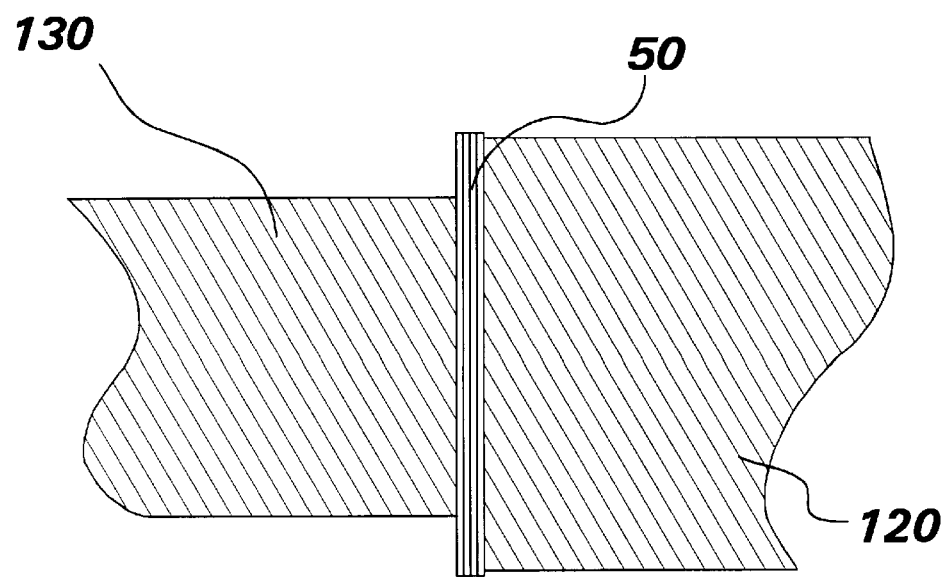
FIG. 4 is a perspective partial top view of an alternative embodiment of the endless belt having a reduced width belt section as further shown in FIG. 5.

An alternative embodiment of the pizza paddle device 200 is shown in FIGS. 4 and 5. FIG. 4 is a perspective partial top view of an alternative endless belt 120 wherein said alternative endless belt 12O has a reduced width belt section 130 and a belt handle means 50. Said reduced width belt section 130 begins at said belt handle means 50 and continues in a direction proximal to a support handle portion 80 (not shown) for approximately half the total length of said alternative endless belt 120. As shown in FIG. 5, said alternative pizza paddle device 200 comprises an alternative spatula portion 150 and the support handle portion 80 and further said alternative spatula portion 150 has a slot means 160. Said slot means 160 further defining a horizontal slot proximal to said support handle portion 80 and of sufficient length and width to allow reduced width belt section 130 to pass through said horizontal slot means 160 while providing sufficient structural strength to support any food item placed on said alternative spatula portion 150.

The pizza paddle device 10 and alternative pizza paddle device 200 can be made from many materials, including but not limited to wood, stainless steel, aluminum and synthetic substances such as various plastics. Pizza paddle device 10 can be used not only for supporting pizzas, but also for many other food items including but once again not limited to pastries and bread. Endless belt 30 and endless belt 120 with reduced width belt section 130 can be made from many materials, including but not limited to cotton, synthetic materials such as rayon and nylon and combinations thereof and may further have coatings including, but not limited to Teflon™ and similar non-sticking coatings.

From the foregoing, it will be observed that numerous modifications and variations can be effected without departing from the true spirit and scope of the novel concepts of the present invention. It will be appreciated that the present disclosure is intended as an exemplification of the invention, and is not intended to limit the invention to the specific embodiments illustrated. The disclosure is intended to cover by the appended claims all such modifications as fall within the scope of the claims.

The preferred embodiments of the present invention disclosed herein have been discussed for the purpose of familiarizing the reader with the novel aspects of the invention. Although preferred embodiments of this invention have been shown, many changes, modifications, and substitutions may be made by one having ordinary skill in the art without departing from the scope and spirit of the invention as described in the following claims.

What is claimed is:

1. A pizza paddle device for transferring a pizza or other food items from a preparation area onto a pizza stone or other heating surface, said device comprising:

a support handle portion;

a spatula portion having a support surface wherein pizza or other food items are supported;

an endless belt having a generally circular configuration;

and an endless belt handle means, whereby pulling or pushing the support handle portion while holding the endless belt handle means stationary causes the endless belt to rotate about the spatula portion in an autosynchronous manner to move a pizza or other food items onto or off the endless belt without disturbance of the pizza or other food items.

2. A pizza paddle device according to claim 1, wherein said endless belt handle means comprises a handle attached by any appropriate means in a direction horizontal to said endless belt.

3. A pizza paddle device according to claim 2, wherein said spatula portion having a support surface constructed to a minimal thickness or has a tapered end section at the end of said spatula portion opposite said support handle portion.

4. A pizza paddle device according to claim 3, wherein said endless belt has a slot means defining a longitudinal slot such that said longitudinal slot begins at said belt handle and continues in a direction proximal to said support handle portion thereby engaging said support handle and continuing for approximately half the total length of said endless belt.

5. A pizza paddle device according to claim 3, wherein said spatula portion has a slot means defining a horizontal slot proximal to said support handle portion and of sufficient length and width to allow said endless belt to pass through said horizontal slot while providing sufficient structural strength to support any food item placed on said spatula portion.

6. A pizza paddle device according to claim 5, wherein said endless belt has a reduced section such that said reduced section begins at said belt handle and continues in a direction proximal to said support handle portion thereby passing through said horizontal slot in said spatula portion and continuing for approximately half the total length of said endless belt.

* * * * *